Figure 1:
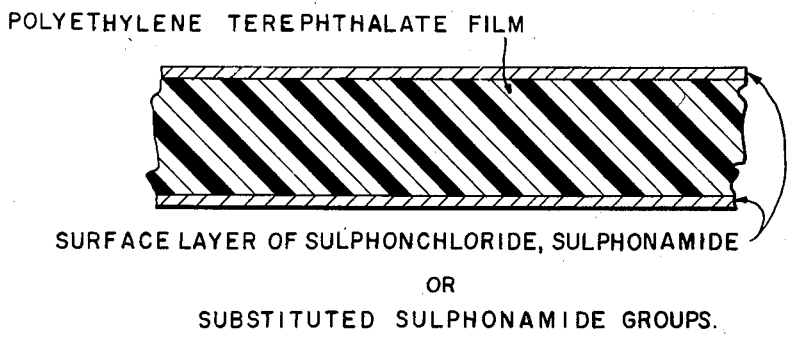

Sept. 3, 1957 A. E. AMBLER 2,805,173
PHOTOGRAPHIC FILM BASE AND PROCESS FOR THE MANUFACTURE THEREOF
Filed June 11, 1956

POLYETHYLENE TEREPHTHALATE FILM

SURFACE LAYER OF SULPHONCHLORIDE, SULPHONAMIDE
OR
SUBSTITUTED SULPHONAMIDE GROUPS.

*INVENTOR*
ARNOLD EDWIN AMBLER

BY Cushman, Darby & Cushman
*ATTORNEYS*

United States Patent Office 2,805,173
Patented Sept. 3, 1957

2,805,173

PHOTOGRAPHIC FILM BASE AND PROCESS FOR THE MANUFACTURE THEREOF

Arnold Edwin Ambler, Manchester, England, assignor to Imperial Chemical Industries Limited, London, England, a corporation of Great Britain Application June 11, 1956, Serial No. 590,396

7 Claims. (Cl. 117—62)

This invention relates to an improved photographic film base and to a process for the manufacture thereof.

In the manufacture of photographic films a thin "subbing layer," for example a thin layer containing gelatine, is frequently applied to the surface of the film base in order to anchor the water-permeable colloid layers to the film base.

It is known that drawn polyethylene terephthalate film has the physical and chemical properties desired for a photographic film base. The commercial development of polyethylene terephthalate film for this purpose has however been adversely affected by the difficulty of ensuring a satisfactory adhesion of the water-permeable colloid layers to the surface of the film base.

It has now been found that this difficulty can be overcome by treating the surface of polyethylene terephthalate film base with one or more reagents to introduce sulphonchloride groups or substituted or unsubstituted sulphonamide groups into the polyethylene terephthalate molecules at or near the surface of the film base.

According to the invention therefore there is provided a new photographic film base which comprises a polyethylene terephthalate film, the molecules at or near the surface of which carry as substituents sulphon-chloride, sulphonamide or substituted sulphonamide groups.

According to a further feature of the invention there is provided a process for the manufacture of new photographic film base which comprises treating a polyethylene terephthalate film with chlorosulphonic acid and if desired subsequently treating the film with a primary or secondary amine.

The treatment with chlorosulphonic acid is conveniently carried out by immersing the film in a solution of chlorosulphonic acid in an inert solvent for example ethylene dichloride or trichloroethylene and allowing the chlorosulphonic acid to react with the surface of the film for a controlled time. The time and temperature of the treatment can be varied to obtain any desired degree of substitution but in general when using a dilute solution of chlorosulphonic acid, treatment times of between 2 seconds and 10 minutes at temperatures between 0° C. and 50° C. are found to be suitable. The residual solvent on the surface of the film can be removed by evaporation but if the solvent is soluble in the medium used for the next stage of the process, the residual solvent may be left on the film.

The subsequent treatment with the primary or secondary amine may be carried out by passing the film through a dilute solution of the amine. Suitable amines are for example tetraethylene pentamine and isobutylamine, but other compounds containing primary or secondary amino groups, such as natural proteins, for example gelatine, may be used, if desired. The solvent used may be removed by evaporation if desired, but this may not be necessary if the solvent is miscible with the solvent to be subsequently used for coating the water-permeable colloid layers.

The film base obtained by the process of my invention may be coated with one or more gelatino silver halide emulsion layers, which may be differently sensitised and may contain colour formers if desired, and with filter or anti-halation layers. The gelatine emulsion layers show excellent adhesion to the film base, they are not readily removed from the film base by abrasion and no separation of the layers from the base occurs when the film is torn or cut.

If desired a gelatino-silver halide emulsion can be coated onto the film directly after the chlorosulphonic acid treatment but it is preferred to treat the film with gelatine or other amino- compound before coating a gelatino silver halide emulsion.

It is sometimes advantageous to coat the film base made by the process of my invention with a hardened gelatine layer in order to improve the adhesion of the sensitive layers. This is especially valuable when light sensitive layers containing colour formers are to be coated onto the film base. If desired this coating with hardened gelatine may be carried out after the treatment with a different primary or secondary amine.

The invention is illustrated but not limited by the following examples in which the parts are by weight:

*Example 1*

A roll of polyethylene terephthalate film base which has previously been cold drawn in two directions, is passed through a bath containing a solution of 1 part of chlorosulphonic acid in 99 parts of dry trichloroethylene, so that both sides of the film base are immersed in the bath for 0.5 second. The film base, wetted with the solution, is kept at 20° C. for 15 seconds and the solvent is then evaporated off by passing a current of warm air over the surface of the film base. The film base is then passed through a solution of 8 parts of gelatine in 192 parts of water at 40° C., so that both sides of the film base are immersed in the solution for 0.5 second, and the film base is finally dried in a current of warm air. The gelatine layer formed on the surface of the film base is not readily removed by abrasion and is not separated from the film base when the film base is torn.

*Example 2*

A roll of polyethylene terephthalate film base which has previously been cold drawn in two directions, is passed through a bath containing a solution of 1 part of chlorosulphonic acid in 99 parts of dry trichloroethylene, so that both sides of the film base are immersed in the bath for 0.5 second. The film base, wetted with the solution, is kept at 20° C. for 2 seconds and then passed through a bath containing a solution of 2 parts of tetraethylene pentamine in 98 parts of dry dioxane, so that both sides of the film base are immersed in the solution for 0.5 second. The film base is then washed with water and dried.

When an aqueous gelatino-silver halide emulsion is coated on to the dried film base so obtained and the layer is dried, the layer is not readily removed by abrasion, and is not separated from the film base when the latter is torn. The adhesion of the gelatine layer is not affected by immersing the coated film for 2 minutes in a 1% solution of sodium carbonate or a 1% solution of acetic acid.

*Example 3*

In place of the 2% solution of tetraethylene pentamine in dioxane used in Example 2, a solution of 2 parts of isobutylamine in 98 parts of dioxane is used. The gelatine layer shows the same adhesion to the treated film base as in Example 2.

Example 4

A roll of polyethylene terephthalate film base which has previously been cold drawn in two directions, is passed through a bath containing a solution of 1 part of chlorosulphonic acid in 99 parts of dry trichloroethylene so that both sides of the film base are immersed in the bath for 0.5 second. The excess chlorosulphonic acid solution is removed from the surface of the film by passing the film between two glass rods. The film base is allowed to stand at 15° C. for 6 seconds and then it is passed through a bath containing a 2% solution of isobutylamine in dry dioxan, the time of immersion in the bath being 0.5 second. The film is allowed to stand at 15° C. for 6 seconds, and it is then passed through a bath of water and finally dried.

The film base is coated with a solution of 1 part of gelatine in 200 parts of water containing 10 parts of a hardening solution made by heating 1.08 parts of chromium sulphate and 0.66 part of acetic acid dissolved in 350 parts of water at 50° C. for 30 minutes. The film base is then dried and left to stand for 3 weeks to allow the coating to harden.

When a fast aqueous gelatino-silver halide emulsion formulated either for use as a black and white negative or as the bottom layer for a colour photographic negative is coated onto the film base so obtained and dried, the layer is not readily removed by abrasion, and it is not separated from the film base when the latter is torn. The adhesion of the light sensitive layer is not affected by immersion in either black-and-white or colour photographic processing solutions. The photographic properties of the coatings are at least equal to coatings made with the same emulsions on cellulose triacetate film base either when exposed and developed immediately or after accelerated storage for 7 days at 50° C. and 50% relative humidity.

Figure 2:
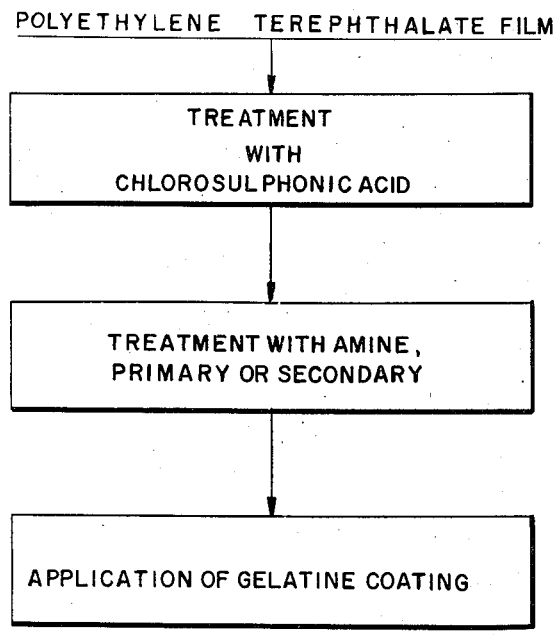

The invention is illustrated by the accompanying drawings. Figure 1 is a cross-sectional view of polyethylene terephthalate film according to the invention. Figure 2 is a flow sheet of the process contemplated herein wherein the polyethylene terephthalate film is treated with chlorosulphonic acid and thereafter treated with amine, primary or secondary, followed by coating with a layer of hardened gelatine.

What I claim is:

1. A new photographic film base which comprises a polyethylene terephthalate film, the molecules adjacent the surface of which carry substituents selected from the class consisting of sulphon-chloride, sulphonamide and substituted sulphonamide groups.

2. A process for the manufacture of new photographic film base which comprises treating a polyethylene terephthalate film with chlorosulphonic acid.

3. The process of claim 2 wherein the polyethylene terephthalate film after said treatment with chlorosulphonic acid is subsequently treated with an amine selected from the group consisting of primary and secondary amines.

4. A process according to claim 3 wherein gelatine is used as the amine.

5. The process of claim 2 wherein said polyethylene terephthalate film is treated with chlorosulphonic acid by immersing said film in a dilute solution of chlorosulphonic acid in an inert solvent for from 2 seconds to 10 minutes at a temperature between 0° C. and 50° C.

6. A process for the manufacture of new photographic film base which comprises treating a polyethylene terephthalate film with chlorosulphonic acid and subsequently coating said film with a layer of hardened gelatine.

7. The process of claim 6 wherein the polyethylene terephthalate film after said treatment with chlorosulphonic acid but prior to coating with gelatine is treated with an amine selected from the group consisting of primary and secondary amines.

References Cited in the file of this patent

UNITED STATES PATENTS

| Number | Name | Date |
|---|---|---|
| 2,461,473 | Kaszuba | Feb. 8, 1949 |
| 2,639,998 | Pavlic | May 26, 1953 |
| 2,668,134 | Horton | Feb. 2, 1954 |
| 2,675,339 | Zenftman | Apr. 13, 1954 |
| 2,698,242 | Saner | Dec. 28, 1954 |
| 2,700,001 | Cohen | Jan. 18, 1955 |
| 2,759,848 | Sullivan | Aug. 21, 1956 |